United States Patent [19]

Monette

[11] 4,256,959
[45] Mar. 17, 1981

[54] OPTICAL SCANNER INCLUDING FEEDBACK FOR REFLECTOR CONTROL

[75] Inventor: William A. Monette, Kettering, Ohio

[73] Assignee: The Mead Corporation, Dayton, Ohio

[21] Appl. No.: 75,298

[22] Filed: Sep. 12, 1979

[51] Int. Cl.³ .............................................. H04N 1/10
[52] U.S. Cl. ..................................... 250/235; 355/68; 358/212; 358/285
[58] Field of Search ........... 250/234, 235, 224, 222 R, 250/561; 355/8, 68; 358/206, 212, 213, 285, 293

[56] References Cited

U.S. PATENT DOCUMENTS

| | | | |
|---|---|---|---|
| 3,422,216 | 1/1969 | Kyte | 358/287 X |
| 3,549,894 | 12/1970 | Ortmann | 250/224 X |
| 3,694,070 | 9/1972 | Libby | 355/8 |
| 3,926,518 | 12/1975 | Berry et al. | 355/68 X |
| 4,041,454 | 8/1977 | Shepard et al. | 358/285 X |

Primary Examiner—David C. Nelms
Assistant Examiner—Edward P. Westin
Attorney, Agent, or Firm—Biebel, French & Nauman

[57] ABSTRACT

An optical scanning device for scanning a document to produce image signals related to the density of the image on successively scanned document areas includes a platen for supporting a document and a surface of substantially uniform reflectivity extending along the edge of the platen. A bar of light is directed such that it strikes the document and the surface of substantially uniform reflectivity and moves across the document in synchronization with optical scanning of the document. Light reflected from the surface of substantially uniform reflectivity is directed to a plurality of reference transducers which sense the position of the bar of light. A servo control loop, responsive to the reference transducers, positions a reflector during the scanning operation such that the area on the document being scanned is properly illuminated.

10 Claims, 3 Drawing Figures

OPTICAL SCANNER INCLUDING FEEDBACK FOR REFLECTOR CONTROL

BACKGROUND OF THE INVENTION

The present invention relates to an optical scanning device and, more particularly, to a scanning device in which only the area of the document being scanned is illuminated.

The optical scanning of a document is a necessary part of the operation of the number of types of devices, including copiers, duplicators, and facsimile transmission devices. Where the image on the document is to be converted into electrical signals, it is common to use photosensitive transducers, such as photodiodes. A transducer of this sort provides an electrical resistance which varies as a function of the amount of light striking the transducer. Typically, the document to be scanned is illuminated and light reflected from the document is directed to one or more such photodiodes by means of scanning optics. The scanning optics are continuously adjusted so that light relected from successive areas across the document will be directed onto the photodiodes.

As the photodiodes receive a number of photons, their resistance changes accordingly. A certain minimum of number of photons must strike the photodiodes, however, for the resistance of the diodes to be altered. With a given intensity of illumination for the image on the document being scanned, therefore, it will be appreciated that the maximum scanning rate of the document is limited by the photosensitivity of the transducer. In order to provide sufficient image resolution at high scan rates, it is necessary to increase the illumination of the master document.

Illuminating the entire document with a large quantity of light, however, has certain drawbacks. If too much light is directed at the document, the document may be adversely affected, as by singeing or discoloring, depending upon the document material. Additionally, it will be appreciated that substantial increases in illumination result in corresponding increases in power consumption. Finally, use of a large number of light sources, such as quartz lamps, for providing high intensity lighting over the entire surface of the document presents substantial cooling problems.

A number of prior art devices have incorporated scanners in which less than all of the original document is illuminated during the scanning operation. U.S. Pat. No. 3,694,070, issued Sept. 26, 1972, to Libby, discloses a copying system which includes scanning illumination elements that focus light on only the area of the original document actually being optically scanned by the system. Rotating reflectors co-operate with stationary lamp elements to project a line of light onto an original document. A rotating mirror scanning arrangement directs light reflected from the original document throught a lens element to an image plane in the copying system for xerographic copying. Scanning of the document and movement of the line of light across the document are accomplished in synchronization. The Libby patent does not disclose how the desired rotation of the reflectors is controlled.

U.S. Pat. No. 3,549,894, issued Dec. 22, 1970, to Ortmann, discloses an optical scanning arrangement in which fixed lamps illuminate a moving scan point. Lenses positioned on the periphery of a rotating scanning wheel focus light onto a document at the scan point. Scanning lenses on the wheel direct relected light to light transducers. A line across the document is therefore scanned by rotation of the lenses past the document. Movement of the document in a direction parallel to the axis of rotation of the scanning wheel results in raster scanning of the entire document.

U.S. Pat. No. 4,041,454, issued Aug. 9, 1977, to Shepard et al discloses a scanning arrangement in which a beam of light scans across a document in raster fashion and is reflected from the document to a single photo-optical transducer. The Shepard et al scanning system requires that a narrow beam of light no larger than the elements into which the image is to be resolved be directed at the master, since the transducer and an associated collecting reflector include no optical focusing elements. The transducer therefore receives all of the light reflected from the document.

U.S. Pat. No. 3,422,216, issued Jan. 14, 1969, to Kyte, discloses a "flying spot" scanner using a scanning beam generated by a cathode ray tube. The spot scans in raster fashion across a transparent film image. Only the light source is moved across the original document. The light receiving optics are fixed in position with respect to the original document and, therefore, the resolution of the image produced is determined by the size of the spot used in scanning.

Thus, it is seen that there is a need for an improved optical scanner in which only an area of the original document corresponding to the area being scanned is illuminated.

SUMMARY OF THE INVENTION

An optical scanning device for scanning a document to produce electrical image signals related to the density of an image on successive scanned document areas includes a platen for supporting a document to be scanned. A reflective reference defines a surface of substantially uniform reflectivity positioned adjacent to the platen. A source of light is directed by an adjustable means such that an area of the document and an area of the surface of substantially uniform reflectivity are illuminated. An image processor transducer means provides electrical image signals in response to light incident thereon while reference means provide electrical reference signals in response to variations in light incident thereon.

An optical scanning means, including a rotatable mirror, directs light reflected from successively scanned areas of the document to the image processor transducer means. Additionally, the optical scanning means directs light reflected from sucessively scanned areas of the surface of substantially uniform reflectivity to the reference means. Means are provided for rotating the rotatable mirror. An illumination control means, responsive to the electrical reference signals, adjusts the adjustable means such that the area on the document which is illuminated corresponds to the area on the document from which reflected light is directed to the image processor transducer means by the optical scanning means.

The adjustable means for directing light from the source of light may comprise an adjustably positionable reflector. The illumination control may comprise means for comparing electrical reference signals received from the reference means to provide an illumination control signal, and means for positioning the reflector means in response to the illumination control signal such that the electrical reference signals are substantially equal.

Accordingly, it is an object of the present invention to provide an optical scanning device in which only a portion of the document being scanned is illuminated at any time; to provide such an optical scanning device in which successive areas across the document are scanned and in which the area of illumination corresponds to each of these successive areas as the areas are scanned; and to provide such a device in which optical reference transducers receive light reflected from a reference surface of uniform reflectivity to sense the position of the light striking the document and provide adjustment of the area of illumination.

DETAILED DESCRIPTION OF THE PREFERRED EMBODIMENT

Figure 1:
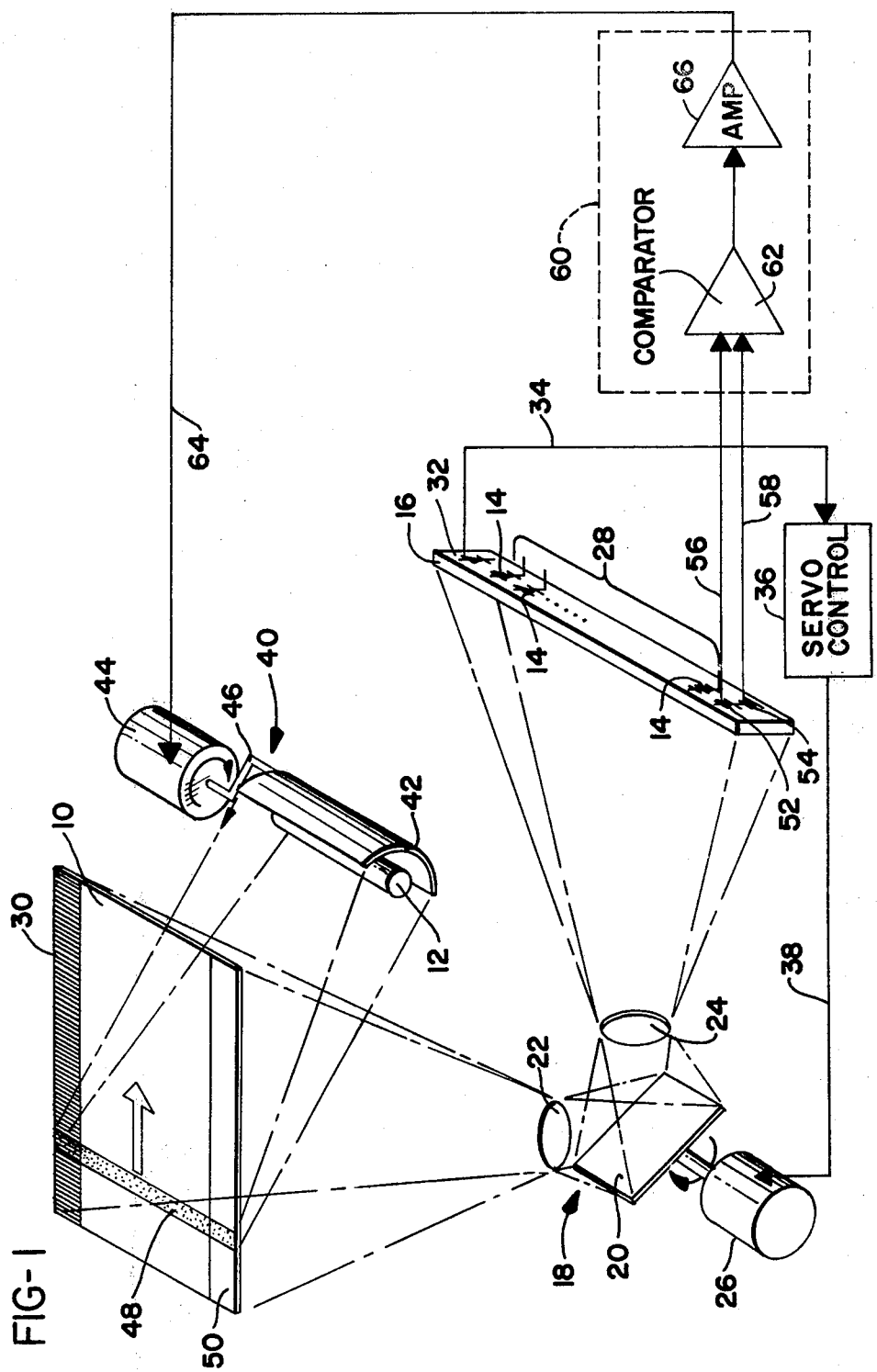
FIG. 1 is a schematic representation of the optical scanning device of the present invention.

Reference is now made to FIG. 1 which illustrates the optical scanning device of the present invention. A document which is to be scanned to produce electrical image signals relating to the density of an image on successively scanned document areas is supported by a platen means, such as transparent plate 10, which may be constructed of glass or other material. The document is placed image-side down such that the image which is to be scanned is illuminated by a source of light 12, such as a quartz lamp, in a manner to be described more completely below. Light reflected from the document image is directed to image processor transducer means, including photodiodes 14, positioned on transducer support bar 16, by means of an optical scanning means 18, including rotatable mirror 20 and lenses 22 and 24.

A motor 26 provides a means for rotating mirror 20 and, as the mirror 20 is rotated, light reflected from successively scanned areas of the document on platen 10 is directed to the transducers 14. A biasing potential is applied to each of the photodiode transducers 14. Light striking a transducer will produce a change in the resistivity of the transducer and a corresponding change in the electrical image signal provided on the line 28 connected to the transducer. The electrical image signals may then be processed by data processing equipment or, alternatively, used to control operation of a matrix printer, such as an ink jet printer, or other types of devices, including facsimile devices. Alternatively, other image processing devices, such as a xerographic printing system may be positioned appropriately to receive light reflected from the document image. It will be appreciated that in order to scan the document image at a uniform scan rate where the document is supported in a plane, it will be necessary to rotate the mirror 20 at a non-uniform angular velocity during the scanning operation. As more fully described in U.S. Pat. No. 4,216,378, a reference grating 30 is positioned adjacent the platen 10 and defines a plurality of evenly spaced reference grating line along one side of the platen. The grating 30 is illuminated and light from the grating directed by means of the scanning means 18 to a transducer 32. The transducer 32 provides a reference pulse train on line 34, the frequency of which corresponds to the rate of scan of the document on platen 10. A servo control circuit 36 compares the reference pulse train on line 34 with a signal of fixed frequency and provides a control signal on line 38 to motor 26. By means of this feedback servo control loop, the angular velocity of mirror 20 is adjusted such that scanning of the document supported on platen 10 is accomplished at a substantially uniform scan rate.

In the optical scanning device of the present invention, light from the source 12 is directed by an adjustable means 40, including a rotatable reflector 42 connected to motor 44 by shaft 46. Reflector 42 focuses a bar of light 48 on a portion of the document, as well as a portion of grating 30 and a portion of reflective reference means 50. Reflective reference means 50 is positioned adjacent the platen 10 and provides a surface of substantially uniform reflectivity onto which light from source 12 is directed.

In the optical scanning device of the present invention, the bar of light 48 is directed to an area of the document which is being scanned and this bar of light is moved in synchronization with progressive scanning of the document image. A plurality of reference means, including photodiode transducers 52 and 54, provides electrical reference signals on lines 56 and 58 in response to variations in light striking the diodes. The optical scanning means 18 directs light reflected from successively scanned areas of the surface of substantially uniform reflectivity to the photodiode transducers 52 and 54 as the rotatable mirror 20 is rotated. An illumination control means 60 is responsive to the electrical reference signals on lines 56 and 58 and adjusts the adjustable means 40 for directing light from the source of light 12 such that the area on the document from which reflected light is directed to the image processor transducers 14 is illuminated.

The illumination control means comprise means, including comparator 62, for comparing the electrical reference signals received on lines 56 and 58 from the photodiode transducers 52 and 54 to provide an illumination control signal on line 64 via servo amplifier 66. Motor 44 acts as a means for positioning the reflector means 42 in response to the output of amplifier 66 such that the electrical reference signals are made substantially equal. An inequality between signals on lines 56 and 58 will result in an appropriate illumination control signal being generated on line 64 such that the reflector 42 will be pivoted by motor 44 to reposition the bar of light 48.

Figure 2:
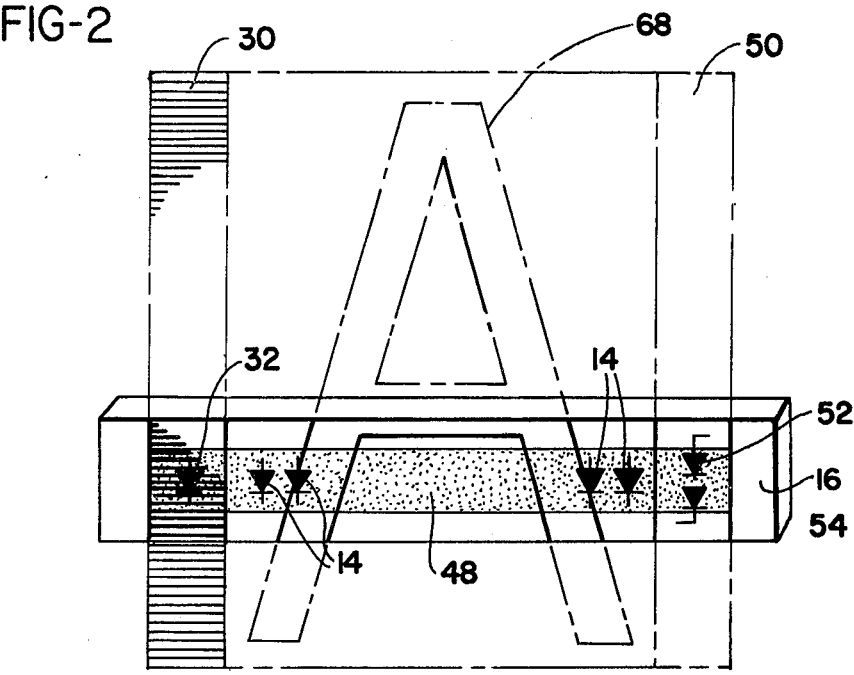
FIG. 2 is a view showing the transducers and the transducer support, with the document image projected onto an imaginary plane parallel to the support.
Figure 3:
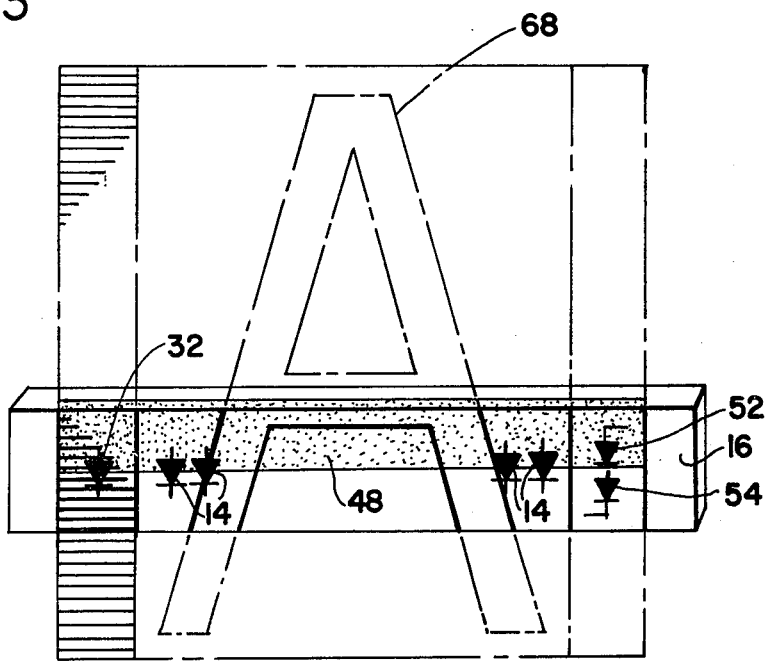
FIG. 3 is a view similar to FIG. 2, but with the area of illumination improperly positioned with respect to the area being scanned.

The manner in which this is accomplished is illustrated diagrammatically in FIGS. 2 and 3. FIGS. 2 and 3 illustrate the transducer support 16 with photodiodes 14, 32, 52, and 54 positioned thereon. The image 68 of the document on platen 10 and the images of grating 30 and reflective reference means 50 are shown as they would appear if projected onto an imaginary surface in the plane of the transducer support 16.

As shown in FIG. 2, the bar of light 48 isappropriately positioned such that the area illuminated corresponds to the area being scanned. Photodiode transducers 52 and 54 are positioned such that they receive light from the opposite edges of the bar. Photodiode transducers 52 and 54 therefore receive equal amounts of light with the result that the electrical reference signals supplied to the servo control loop for positioning reflector 42 (FIG. 1) will be equal.

As may be seen in FIG. 3, if the bar of light 48 is not properly positioned, transducers 14 will be scanning as area on the image 68 which is not fully illuminated. This condition will be sensed, however, by photodiode transducers 52 and 54, since the quantity of light incident upon the diodes will not be equal. In such an event, the illumination control means will provide an illumination control signal which causes the reflector 42 (FIG. 1) to be adjusted such that the bar of light 48 is repositioned, as shown in FIG. 2.

While the form of apparatus herein described constitutes a preferred embodiment of the invention, it is to be understood that the invention is not limited to this precise form of apparatus, and that changes may be made therein without departing from the scope of the invention.

What is claimed is:

1. An optical scanning device for scanning a document to produce electrical image signals related to the density of an image on successively scanned document areas, comprising:
   platen means for supporting a document to be scanned,
   reflective reference means, adjacent said platen means, for providing a suface of substantially uniform reflectivity,
   a source of light,
   adjustable means for directing light from said source of light such that an area of the document and an area of said surface of substantially uniform reflectivity are illuminated,
   image processor transducer means for providing electrical image signals in response to light incident thereon,
   reference means for providing electrical reference signals in response to variations in light incident thereon,
   optical scanning means, including a rotatable mirror, for directing light reflected from sucessively scanned areas of said document to said image processor transducer means and for directing light reflected from successively scanned areas of said surface of substantially uniform reflectivity to said reference means as said rotatable mirror is rotated,
   means for rotating said rotatable mirror, and
   illumination control means, responsive to said electrical reference signals, for adjusting said adjustable means for directing light from said source of light such that the area on said document which is illuminated corresponds to the area on said document from which reflected light is directed to said image processor transducer means by said optical scanning means.

2. The optical scanning device of claim 1 in which said platen means supports said document in a plane and in which said surface of substantially uniform reflectivity is positioned in said plane.

3. The optical scanning device of claim 1 in which said reference means includes a plurality of reference transducers positioned in a row such that they receive light reflected from adjacent areas on said surface of substantially uniform reflectivity, which areas are positioned in a row extending parallel to the direction in which successively scanned areas of said document are scanned.

4. The optical scanning device of claim 1 in which said adjustable means for directing light from said source of light comprises adjustably positionable reflector means.

5. The optical scanning device of claim 4 in which said illumination control means comprises means for comparing said electrical reference signals received from said reference means to provide an illumination control signal, and means for positioning said reflector means in response to said illumination control signal such that said electrical reference signals are substantially equal.

6. An optical scanning device for scanning a document and directing light reflected from successively scanned areas on the document to an image processor, comprising:
   platen means for supporting a document to be scanned,
   reflective reference means, adjacent said platen means, for providing a surface of substantially uniform reflectivity,
   a source of light,
   adjustable means for directing light from said source of light to produce a bar of light extending across a portion of said document and said surface,
   reference means for providing electrical reference signals in response to variations in light incident thereon,
   optical scanning means for directing light reflected from successively scanned areas of said document to said image processor and for directing light reflected from successively scanned areas of surface to said reference means, and
   illumination control means, responsive to said electrical reference signals, for adjusting said adjustable means such that said bar of light illuminates said successively scanned areas of said document as said areas are scanned.

7. The optical scanning device of claim 6 in which said document is supported in a plane by said platen means and in which said surface of substantially uniform reflectivity is positioned substantially in the plane of said document.

8. The optical scanning device of claim 6 in which said reference means includes a plurality of transducers which are positioned in a row such that they recive light reflected from adjacent areas on said surface, said adjacent areas being aligned in a direction extending parallel to the direction in which successively scanned areas of said document are scanned.

9. The optical scanning device of claim 6 in which said adjustable means for directing light from said source of light comprises adjustably positionable reflector means.

10. The optical scanning device of claim 9 in which said illumination control means comprises means for comparing said electrical reference signals received from said reference means to provide an illumination control signal, and means for positioning said reflector means in response to said illumination control signal such that said electrical reference signals are substantially equal.

* * * * *

UNITED STATES PATENT AND TRADEMARK OFFICE
CERTIFICATE OF CORRECTION

PATENT NO. : 4,256,959

DATED : March 17, 1981

INVENTOR(S) : William A. Monette

It is certified that error appears in the above-identified patent and that said Letters Patent are hereby corrected as shown below:

Col. 3, line 66, "line" should be --lines--.
Col. 4, line 60, "isappropriate" should be --is appropriately--.
Col. 5, line 1, "light48" should be --light 48--.
Col. 5, line 2, "as should be --an--.
Col. 6, claim 6, line 34, "said" should precede "surface".
Col. 6, claim 8, line 48, "recive" should be --receive--.

Signed and Sealed this

Thirtieth Day of June 1981

(SEAL)

Attest:

RENE D. TEGTMEYER

Attesting Officer

Acting Commissioner of Patents and Trademarks